United States Patent Office 2,695,873
Patented Nov. 30, 1954

2,695,873

PROCESS FOR CHLORINATING METHYL AROMATIC COMPOUNDS

Anthony Loverde, Niagara Falls, N. Y., assignor to Hooker Electrochemical Company, Niagara Falls, N. Y., a corporation of New York No Drawing. Application April 4, 1952,
Serial No. 280,670

14 Claims. (Cl. 204—163)

This invention relates to the photochemical chlorination of methyl aromatic compounds. More particularly, this invention relates to the side chain substitution chlorination of methyl aromatic hydrocarbons containing at least one methyl group, such as, toluene, xylene, mesitylene and nuclear substituted derivatives thereof which are not decomposed under the conditions of chlorination, such as, chloro toluenes, chloro xylenes, etc. Still more particularly, this invention relates to a liquid phase process for effecting the chlorination of methyl groups attached to an aromatic nucleus, at an elevated temperature, in the presence of actinic light, and in the presence of an acid amide, particularly an acid amide selected from the group consisting of benzamide, urea, acetamide and chlorinated derivatives thereof.

It is known that in the side chain chlorination of aralkyl hydrocarbons in the liquid phase, i. e., at a temperature below or at their reflux temperature, that substitution of hydrogen by chlorine in the side chain is favored with increase in temperature and that the presence of actinic light is necessary to catalyze the reaction. Experience has shown that any discloration in the charge being chlorinated, reduces the efficiency of the light as a catalyst and also reduces the rate of reaction. Therefore, among the ideal conditions for carrying out this type of chlorination are complete absence of discoloration in the reaction mixture and maintenance of a temperature as high as practically possible to the reflux temperature of the material being chlorinated. In the chlorination of certain aralkyl hydrocarbons derived from natural sources such as coal, it is sometimes possible to approach these ideal conditions and to obtain chlorinated products of satisfactory color and chlorine content; but to produce satisfactory products, it is necessary to maintain meticulously clean equipment, especially free from metallic impurities such as iron, and to maintain critical operating conditions within a narrow range; this becomes difficult, and costly, and sometimes uneconomical on a commercial scale. In addition to maintaining these conditions, it is also necessary to employ difficult fractionating procedures, with the result that only a small yield of desirable product is recoverable. Moreover, it is well known that when the aralkyl hydrocarbon is synthetic and is derived from petroleum, as distinguished from natural occurring aralkyl hydrocarbons which are derived from coal, that exhaustive chlorination of the methyl groups is impossible, and that even partial chlorination to only the monochloro stage is not commercially feasible without discoloration. This may be explained by the fact that during the course of the chlorination, and with increased temperature, the product darkens to such a marked degree that the actinic light catalyst cannot effectively penetrate the reaction mixture to catalyze the reaction, thereby making the chlorination incomplete and sluggish. It has been proposed that a reason for this is due to the high "acid-wash value" found in synthetic aralkyl hydrocarbons; see Industrial and Engineering Chemistry, volume 41, September 1949, top of the second column, on page 1813.

It is therefore an object of this invention to provide a process for exhaustively chlorinating a methyl group in aralkyl hydrocarbons derived from petroleum. It is also an object of this invention to provide a process for partially chlorinating a methyl group in petroleum derived aralkyl hydrocarbons without darkening of the product, to give a high yield of desirable product with improved chlorine efficiencies. It is a further object of this invention to provide a process for chlorinating a methyl group in nuclear substituted aralkyl hydrocarbons derived from petroleum, which are not decomposed under the conditions of chlorination, particularly methyl benzenes containing chlorine in the ring or chain. It is an additional object of this invention to provide a process for the chlorination of methyl groups in aralkyl hydrocarbons, and their chlorinated derivatives, derived from coal, with both a saving in time and an increase in yield of desired product and with improved chlorine efficiency, but without the necessity for maintaining critical operating conditions, thereby rendering such processes more economical or adaptable on a commercial scale. It is still another object of this invention to provide a process for exhaustively chlorinating methyl groups attached to an aromatic nucleus in compounds derived from coal, with both a saving in time and an increase in yield of desired product, and with improved chlorine efficiency and without discoloration. Other objects will become apparent to those skilled in the art on consideration of this disclosure.

These and related objects can be accomplished by the present invention which comprises effecting the photochemical thermal chlorination of methyl groups attached to the nucleus of aromatic compounds in the presence of an acid amide. I have found the methyl groups of aromatic hydrocarbons having the following general formula:

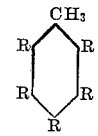

wherein R is selected from the group consisting of hydrogen, chlorine, methyl and chloromethyl, can be chlorinated in a methyl group to any desired degree of chlorine content, up to and including the trichloromethyl stage, without discoloration or decomposition, by effecting the chlorination at an elevated temperature, in the presence of light, and in the presence of a small amount of an acid amide particularly selected from the group consisting of benzamide, urea, acetamide and chlorinated derivatives thereof.

In the following examples which are given to illustrate this invention further, but which are not to be construed as limiting, except as defined in the appended claims, two chlorinations were run side by side. Part A of each example illustrates the chlorination by methods known heretofore and Part B illustrates the chlorination in accordance with the present invention. In both Parts A and B, the materials were chlorinated at the same time under identical conditions, except as hereinafter pointed out.

EXAMPLE 1

Part A

Into a glass chlorination apparatus equipped with an inlet for gaseous chlorine, an outlet, heating and/or cooling means, temperature recording means, a reflux condenser and an incandescent lamp was charged 50 grams of clear, water-white mesitylene. After the temperature of the charge had been raised to 70 degrees centigrade, chlorine was bubbled into the liquid under the influence of the light emitted from the incandescent lamp. With the introduction of gaseous chlorine, the temperature of the reaction mixture rose to approximately 125 degrees centigrade, whereupon discoloration of the liquid started to take place. The discoloration increased as the chlorination progressed so that by the time the reaction temperature reached 150 degrees centigrade the material was practically black in color. The introduction of gaseous chlorine was discontinued, as no apparent chlorination was taking place, as evidenced by the presence of free chlorine in the exit gases, presumably because the light could not penetrate the reaction mixture, due to the black color. The product was not found to contain any desirable chlorinated material, as evidenced by the lack of crystals forming when cooled to a temperature of minus 20 degrees centigrade.

Part B

The experiment described in Part A above was duplicated except that 0.1 gram of benzamide was added to the mesitylene prior to chlorination. However, when the chlorination temperature rose to 125 degrees centigrade no discoloration took place. The chlorination was continued at a temperature of 150 degrees centigrade, without any discoloration of the liquid, until there was apparently no more chlorine being absorbed. The final product recovered from the chlorination by cooling the reaction mixture was a white, crystalline solid having a melting point of 75 degrees centigrade and a total chlorine content of 73.4 per cent which corresponds to 1,3,5 tri-(trichloromethyl) benzene which has a theoretical chlorine content of 74 per cent.

EXAMPLE 2

Part A

Into an apparatus similar to that described in Example 1, and equipped for chlorinating aralkyl hydrocarbons in the liquid phase in the presence of actinic light emitted from a mercury vapor lamp was charged 1,000 grams of clear, water-white para xylene derived from petroleum. The para xylene charged had been pretreated to effect a purification, by agitating with wet powdered sodium carbonate, mixing with fuller's earth, and filtering. Chlorine was introduced into the clear, water-white reactant liquid at a starting temperature of about 90 degrees centigrade. As soon as the induction period was over, and with the continued introduction of chlorine, the temperature of the reaction mixture began to increase. When a temperature of 100 degrees centigrade was reached, discoloration began to take place. At a reaction temperature of 135 degrees centigrade, the product was reddish-brown in color and turned dark brown in color with continued introduction of chlorine. The introduction of gaseous chlorine was discontinued when no apparent chlorination was taking place as evidenced by free chlorine in the exit gases. The dark brown product was not found to contain any desirable chlorinated material, as evidenced by the lack of crystallization on cooling to room temperature.

Part B

The experiment described in Part A above was duplicated except that 1.0 gram of benzamide was added to the para xylene prior to chlorination. However, when the chlorination temperature rose to 100 degrees centigrade no discoloration took place. The chlorination was continued at a temperature up to 170 degrees centigrade, without any discoloration of the liquid, until all of the hydrogen atoms in the methyl groups had been replaced by chlorine and no more chlorine was being absorbed. The final product recovered from the chlorination by cooling the reaction mixture was obtained in over 90 per cent yield and was a white, crystalline solid having a melting point of 105.5 degrees centigrade, a total chlorine content of 68.8 per cent and corresponded to para xylene hexachloride or para bis-(trichloromethyl) benzene which has a theoretical chlorine content of 68.1 per cent.

EXAMPLE 3

Part B of Example 2 was repeated except that the charge was 372 grams of petroleum para xylene and 3.7 grams of urea were used instead of benzamide. The chlorination was effected at a temperature of between 135 and 200 degrees centigrade, without any discoloration of the liquid taking place; white crystalline para xylene hexachloride having a melting point of 103 degrees centigrade was recovered from the chlorination mixture by cooling.

Part B of Example 2 was repeated again using acetamide instead of benzamide and a similar result was obtained. In this case, however, some of the acetamide volatilized at the high chlorination temperature and crystallized in the reflux condenser; notwithstanding, para xylene hexachloride of good quality was produced.

EXAMPLE 4

Part A

Into a 500 gallon enamel lined chlorination vessel equipped with accessories similar to that employed in connection with the apparatus of Example 1 was charged 3,375 pounds of monochlorotoluene derived from coal tar toluene and containing about 60 per cent of the ortho isomer and about 40 per cent of the para isomer. The charge was heated to a temperature of 100 degrees centigrade, then chlorine was bubbled into the charge, under the influence of actinic light emitted from a mercury vapor lamp, at the rate of approximately ten pounds per hour until the induction period was over, after which the rate of introducing chlorine was increased to approximately 110 pounds per hour. The chlorination temperature increased to about 100 degrees centigrade and was maintained at a temperature between 100 and 170 degrees centigrade during the remainder of the procedure. Samples were removed when the material undergoing chlorination reached a specific gravity of 1.500 measured at 25 degrees centigrade to determine the melting point. At this gravity the sample of product inspected was dark brown in color and on cooling to a temperature of minus 30 degrees centigrade would not crystallize, indicating that the highly chlorinated product desired was not formed during the chlorination. The chlorination was continued until another sample gave a specific gravity of 1.520 at 25 degrees centigrade; this consumed a total chlorination time of 60 hours. The 1.520 gravity sample was a dark brown color, and would not form crystals on cooling to a temperature of minus 30 degrees centigrade.

Part B

The procedure described in Part A above was duplicated, except that two pounds of benzamide were added to the monochlorotoluene prior to chlorination. However, when the first sample of the product was taken at a specific gravity of 1.500 measured at 25 degrees centigrade, no discoloration was evidenced, and on cooling, white crystals were formed. The chlorination was continued until a maximum last crystal point of the product was obtained, which was after only 40 hours of total chlorination time. The final product recovered was a water-white liquid at room temperature, having a last crystal point of 4.0 degrees centigrade and corresponded to the desired mixture of isomers of monochlorobenzotrichloride.

The improvement in yield of chlorobenzotrichloride realized, by the procedure of Example 4B as compared to the procedure of Example 4A, is indicated by the fact that fluorination of both products by the same procedure using anhydrous hydrogen fluoride, results in about 20 per cent more chlorobenzotrifluoride being produced from the product of Example 4B, than from the product of Example 4A.

EXAMPLE 5

Part A

Into an apparatus similar to that described in Example 1 was charged 2,410 grams of clear, water-white meta xylene derived from petroleum. The meta xylene charge had been pretreated to effect a purification, by agitating with wet sodium carbonate, mixing with fuller's earth, and filtering. Chlorine was introduced into the clear, water-white reactant liquid at a starting temperature of about 90 degrees centigrade. As soon as the induction period was over, and with the continued introduction of chlorine, the temperature of the reaction mixture began to increase. When a temperature of about 100 degrees centigrade was reached, the product was brown in color and darkened further with continued introduction of chlorine. The chlorination was discontinued when no apparent reaction was taking place, as evidenced by the presence of free chlorine in the exit gases. The dark brown product recovered did not contain any desirable chlorinated material, as evidenced by the lack of crystallization on cooling to room temperature.

Part B

The experiment described in Part A above was duplicated except that ten grams of benzamide was added to the meta xylene prior to chlorination. However, when the chlorination temperature rose to 100 degrees centigrade no discoloration took place. The chlorination was continued at a temperature between 135 and 170 degrees centigrade, without any discoloration of the liquid, until the hexachloro stage was reached. The final product recovered from the chlorination by cooling the reaction mixture to room temperature was recovered in over 95 per cent yield and was a white crystalline solid, having a last crystal point of 31.5 degrees centigrade and a total chlorine content of 68.9 per cent, and corresponded to meta xylene hexachloride or meta bis-(trichloromethyl)

benzene which has a theoretical chlorine content of 68.1 per cent.

In a manner after Part B of the foregoing examples, 540 grams of toluene was photochemically chlorinated in the presence of 2.7 grams of benzamide at a chlorination temperature between 110 and 150 degrees centigrade to yield colorless benzotrichloride containing less than one per cent by weight of chlorine substituted in the benzene ring. In like manner, 2,6-dichloro toluene was photochemically chlorinated in the presence of one-half per cent by weight of benzamide at a chlorination temperature between 140 and 200 degrees centigrade until a specific gravity of 1.525 measured at 25 degrees centigrade was reached and a chlorine content of 62.3 per cent was obtained corresponding to the desired 2,6-dichlorobenzal chloride which has a theoretical chlorine content of 61.5 per cent. Other products such as, nuclear chlorinated xylenes or nuclear substituted aromatic hydrocarbons, such as, toluene, xylene and mesitylene containing nuclear substitutents, which are non-reactive under the conditions maintained during the photochemical thermal chlorination in the presence of acid amides, may be chlorinated in their methyl groups to any desired chlorine containing stage, including the perchloromethyl stage, in accordance with this invention. In addition chloromethyl aromatics containing incompletely chlorinated methyl groups may be further chlorinated to a higher chloromethyl stage in accordance with this invention; for example, benzyl chloride may be chlorinated to the higher benzal- or benzochlorides. Likewise, nuclear chloro substituted benzal or benzyl chlorides may be further chlorinated in the methyl groups to a higher chloromethyl stage. Similarly, xylenes, mesitylenes, and nuclear chloro substituted derivatives thereof containing partially chlorinated methyl groups may also be chlorinated to a higher chlorine content in their methyl groups in accordance with this invention. It is of course apparent that this invention includes chlorinating mixtures of the foregoing materials, as indicated in the examples, and that it is particularly useful for chlorinating methyl groups in methyl aromatic hydrocarbons and chlorinated derivatives thereof.

Among the acid amides which have been found particularly effective in accordance with this invention are those selected from the group consisting of benzamide, urea, and acetamide, however, other acid amides may be suitably employed particularly substituted acid amides of the preferred group defined, for example, the chlorinated derivatives thereof which may be formed during the reaction. Still other acid amides such as succinamide, oxamide and the like may suitably be employed.

The proportion of acid amide which should be used in order to obtain satisfactory results is at least 0.05 per cent by weight of the material being chlorinated and is generally within the range of 0.05 to 5 per cent by weight, and although no useful effect may be obtained by using an excessively large proportion of acid amide, no ill effects are known to occur, since the excess may be removed by ordinary techniques known in the art. The proportion varies with the specific materials involved; for example, volatility or boiling point of the chosen acid amide is an important consideration, especially when a high temperature of reaction is to be maintained. The solubility of the various acid amides in the materials to be chlorinated is a factor which varies greatly, however, I have found that in order to obtain a satisfactory result in accordance with this invention, it is not necessary to have the chosen amount of acid amide completely soluble in the material to be chlorinated; partial solubility may be satisfactory. I have found that when chlorinating methyl benzenes, up to the trimethyl benzenes, such as mesitylene, to the stage where all three methyl groups are perchlorinated, that satisfactory results may be obtained when employing between 0.1 and 1.0 per cent by weight of any of the acid amides selected from the preferred group consisting of benzamide, urea, acetamide and chlorinated derivatives thereof.

The source of light chosen to photochemically catalyze the reaction may be selected from a wide range and should generally include light having a wave length from about 2,000 to about 5,000 angstrom units, and should preferably include wave lengths between 3,000 and 4,000 angstrom units. The photochemical catalytic effect may be obtained by exposing the reaction mixture to the light emitted from an ordinary incandescent lamp, however, more efficient reaction is obtained when employing a mercury vapor lamp as the source for actinic light. It is to be understood therefore that any source of light which is effective in catalyzing side chain chlorinations may suitably be employed in the process of this invention.

The temperature at which the chlorination is effected in accordance with this invention is generally higher than that permitted without the addition of an acid amide, primarily because the acid amides of this invention prevent discoloration, even at the high reaction temperatures, thereby permitting a more rapid and complete reaction, a more efficient utilization of chlorine, and a recovery of higher yield of desirable product.

The reaction time is dependent upon the degree of chlorination desired and in general will be less than that required without the addition of an acid amide, as illustrated among the foregoing examples.

Various techniques may be employed for determining the progress of the reaction, including testing of the effluent gases for by-product hydrogen chloride or free chlorine, sampling of the product from time to time during the progress of the chlorination for determination of its specific gravity, or, melting point, etc., and the most suitable technique is readily ascertained for any given chlorination in accordance with known principles.

Various modifications which are contemplated as falling within the scope of this invention are indicated by the foregoing description and this invention is not to be construed as specifically limited thereto except as defined in the appended claims.

I claim:

1. The process for chlorinating methyl groups in methyl aromatic compounds which comprises: adding at least 0.05 per cent by weight of an acid amide to the material to be chlorinated; exposing the reaction mixture so produced to actinic light; and introducing gaseous chlorine into the reaction mixture maintained at an elevated temperature and in the liquid phase until the desired stage of chlorination is obtained.

2. The process of claim 1 wherein the acid amide is selected from the group consisting of benzamide, urea, acetamide and chlorinated derivatives thereof.

3. The process of claim 2 wherein the acid amide is urea.

4. The process of claim 2 wherein the acid amide is acetamide.

5. The process of claim 2 wherein the acid amide is benzamide.

6. The process of claim 2 wherein the acid amide is benzamide and is present in 0.1 to 5 per cent by weight of the material being chlorinated.

7. The process of claim 2 wherein the aromatic compound is derived from petroleum.

8. The process of claim 7 wherein the aromatic compound is a methyl benzene.

9. The process of claim 8 wherein the aromatic compound is a methyl benzene containing 1 to 3 methyl groups.

10. The process of claim 9 wherein a methyl group is perchlorinated.

11. The process for chlorinating methyl groups in methyl aromatic compounds derived from petroleum which comprises: adding at least 0.5 per cent by weight of an acid amide to the material to be chlorinated; exposing the reaction mixture so produced to actinic light; introducing chlorine into the irradiated reaction mixture; and, maintaining the reaction mixture in the liquid phase at an elevated temperature while continuing the introduction of chlorine until the desired stage of chlorination is obtained.

12. The process of claim 11 wherein the methyl aromatic compound derived from petroleum is a methyl benzene and the acid amide is selected from the group consisting of benzamide, urea, acetamide and chlorinated derivatives thereof.

13. The process of claim 12 wherein the methyl benzene derived from petroleum contains 1 to 3 methyl groups and wherein between about 0.1 and 1 per cent by weight of benzamide is added to the material to be chlorinated.

14. The process of claim 13 wherein the chlorination is continued until a methyl group is perchlorinated.

(References on following page)

References Cited in the file of this patent

UNITED STATES PATENTS

| Number | Name | Date |
|---|---|---|
| 1,828,858 | Conklin | Oct. 27, 1931 |
| 2,043,257 | Missbach | June 9, 1936 |
| 2,132,361 | Osswald et al. | Oct. 4, 1938 |
| 2,136,334 | Coleman et al. | Nov. 8, 1938 |
| 2,542,225 | West | Feb. 20, 1951 |